(12) United States Patent
Wang et al.

(10) Patent No.: US 12,482,225 B2
(45) Date of Patent: Nov. 25, 2025

(54) METHOD, ELECTRONIC DEVICE, AND COMPUTER PROGRAM PRODUCT FOR ACQUIRING IMAGE

(71) Applicant: Dell Products L.P., Round Rock, TX (US)

(72) Inventors: Zijia Wang, WeiFang (CN); Jinpeng Liu, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 17/990,366

(22) Filed: Nov. 18, 2022

(65) Prior Publication Data

US 2024/0185564 A1    Jun. 6, 2024

(30) Foreign Application Priority Data

Oct. 21, 2022   (CN) .......................... 202211294417.4

(51) Int. Cl.
*G06V 10/74*     (2022.01)
*G06V 10/764*    (2022.01)
(Continued)

(52) U.S. Cl.
CPC .......... *G06V 10/761* (2022.01); *G06V 10/764* (2022.01); *G06V 10/7715* (2022.01);
(Continued)

(58) Field of Classification Search
CPC ............. G06V 10/761; G06V 10/7715; G06V 10/7796; G06V 10/82; G06V 10/774; G06V 10/764
(Continued)

(56) References Cited

U.S. PATENT DOCUMENTS 9,721,190 B2 *   8/2017   Vijayanarasimhan ......................
                                                       G06N 3/082
10,657,361 B2 *  5/2020   Appleyard ............ H04L 9/3231
(Continued)

OTHER PUBLICATIONS

S. Sabour et al., "Dynamic Routing Between Capsules," arXiv:1710.09829v2, Nov. 7, 2017, 11 pages.
(Continued)

*Primary Examiner* — Mark Roz
(74) *Attorney, Agent, or Firm* — Ryan, Mason & Lewis, LLP (57) ABSTRACT

Embodiments of the present disclosure relate to a method, an electronic device, and a computer program product for acquiring an image. The method includes distilling an original image set through a capsule neural network model to generate a distilled image set, wherein the distilled image set includes a plurality of distilled images. The method further includes acquiring a first feature of a first image through the capsule neural network model. The method further includes acquiring a plurality of distilling features of the plurality of distilled images respectively through the capsule neural network model. The method further includes determining a plurality of similarities between the first feature and the plurality of distilling features respectively. The method further includes acquiring at least one original image matching the first image based on the plurality of similarities.

20 Claims, 8 Drawing Sheets

(51) Int. Cl.
  *G06V 10/77*   (2022.01)
  *G06V 10/774*  (2022.01)
  *G06V 10/778*  (2022.01)
  *G06V 10/82*   (2022.01)

(52) U.S. Cl.
  CPC ........ *G06V 10/774* (2022.01); *G06V 10/7796* (2022.01); *G06V 10/82* (2022.01)

(58) Field of Classification Search
  USPC ........................................................ 382/157
  See application file for complete search history.

(56) References Cited

U.S. PATENT DOCUMENTS

| | | | | |
|---|---|---|---|---|
| 10,846,554 | B2* | 11/2020 | Alcock | G06N 3/08 |
| 11,042,776 | B1* | 6/2021 | Buhler | H04N 1/00018 |
| 2016/0358043 | A1* | 12/2016 | Mu | G06V 30/194 |
| 2017/0316287 | A1* | 11/2017 | Mu | G06V 10/70 |
| 2019/0121877 | A1* | 4/2019 | Vyas | G06V 10/771 |
| 2020/0104721 | A1* | 4/2020 | Mori | G06V 10/761 |

OTHER PUBLICATIONS

Z. Liu et al., "DeepFashion: Powering Robust Clothes Recognition and Retrieval with Rich Annotations," Proceedings of the IEEE Conference on Computer Vision and Pattern Recognition, Jun. 2016, pp. 1096-1104.

* cited by examiner

METHOD, ELECTRONIC DEVICE, AND COMPUTER PROGRAM PRODUCT FOR ACQUIRING IMAGE

RELATED APPLICATION

The present application claims priority to Chinese Patent Application No. 202211294417.4, filed Oct. 21, 2022, and entitled "Method, Electronic Device, and Computer Program Product for Acquiring Image," which is incorporated by reference herein in its entirety.

FIELD

Embodiments of the present disclosure relate to the field of image processing, and in particular, to a method, an electronic device, and a computer program product for acquiring an image.

BACKGROUND

In recent years, similar content retrieval is playing an increasingly important role in numerous application scenarios. For example, in a scenario in which a company provides a large-scale and complex information service to users, the users can propose various service requests. Experienced engineers may usually summarize a process for solving a certain service request and create the summarized results as a service request database. When receiving a new service request from a user, engineers can search the database for solutions of service requests that are similar to the new service request and have already been solved, so that they can provide a solution to the user quickly.

SUMMARY

Embodiments of the present disclosure provide a method, an electronic device, and a computer program product for acquiring an image.

According to a first aspect of the present disclosure, a method for acquiring an image is provided. The method includes distilling an original image set through a capsule neural network model to generate a distilled image set, wherein the distilled image set includes a plurality of distilled images. The method further includes acquiring a first feature of a first image through the capsule neural network model. The method further includes acquiring a plurality of distilling features of the plurality of distilled images respectively through the capsule neural network model. The method further includes determining a plurality of similarities between the first feature and the plurality of distilling features respectively. The method further includes acquiring at least one original image matching the first image based on the plurality of similarities.

According to a second aspect of the present disclosure, an electronic device is provided. The electronic device includes at least one processor; and a memory coupled to the at least one processor and having instructions stored thereon, wherein the instructions, when executed by the at least one processor, cause the electronic device to execute actions including: distilling an original image set through a capsule neural network model to generate a distilled image set, the distilled image set including a plurality of distilled images; acquiring a first feature of a first image through the capsule neural network model; acquiring a plurality of distilling features of the plurality of distilled images respectively through the capsule neural network model; determining a plurality of similarities between the first feature and the plurality of distilling features respectively; and acquiring at least one original image matching the first image based on the plurality of similarities.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By the following Detailed Description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Illustrative embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, similar content retrieval is playing an increasingly important role in numerous application scenarios. In addition to providing similarity content retrieval based on a user request as stated above, in other various retrieval scenarios, similarity content retrieval is also becoming popular among users. One commonly used scenario may be an online shopping scenario. For example, a user may input an inquired image to a corresponding application and intend to retrieve other images (e.g., images including clothes of one style) similar to a target object (e.g., the target object may be clothes of a similar style) in the inquired image. The application may output other images similar to the inquired image to the user through similar content retrieval, e.g., images including similar target objects.

In view of the increasingly wide application of similar content retrieval and the increasingly close relationship with end users, it is expected to provide users with images matching inquired images quickly, efficiently, and accurately, so as to improve the user experience.

To solve at least the above and other potential problems, an embodiment of the present disclosure provides a method for acquiring an image. The method includes distilling an original image set through a capsule neural network model to generate a distilled image set, wherein the distilled image set includes a plurality of distilled images. The method further includes acquiring a first feature of a first image through the capsule neural network model. The method further includes acquiring a plurality of distilling features of the plurality of distilled images respectively through the capsule neural network model. The method further includes determining a plurality of similarities between the first feature and the plurality of distilling features respectively. The method further includes acquiring at least one original image matching the first image based on the plurality of similarities. Based on the method for acquiring an image according to embodiments of the present disclosure, an image matching an inquired image can be provided quickly, efficiently, and accurately to a user, thereby greatly improving the user experience. In addition, based on the method for acquiring an image of embodiments of the present disclosure, the distilled images are generated by the capsule neural network model, and the features of the images can also be extracted while similarity comparison is performed. Accordingly, there is no need to design a complex model, so the operation cost can be greatly reduced, and the application prospect is broad.

Figure 1:
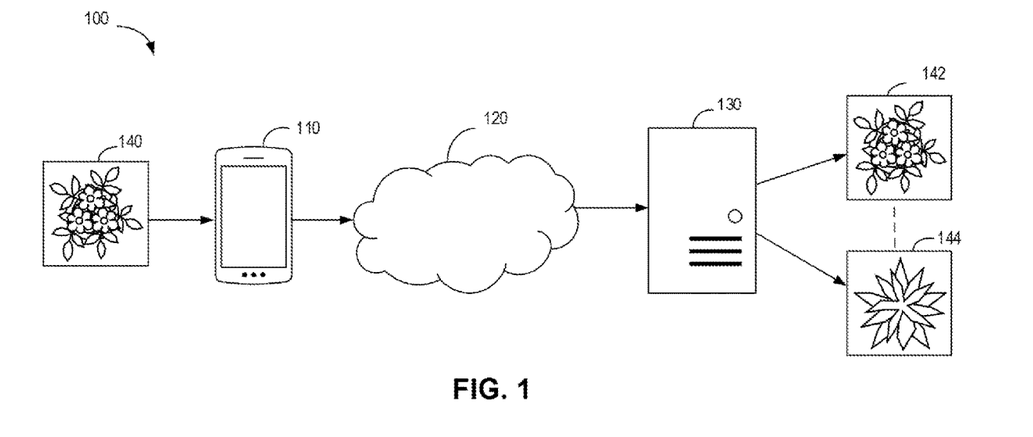
FIG. 1 illustrates a schematic diagram of an example environment in which a device and/or a method according to embodiments of the present disclosure can be implemented.

Embodiments of the present disclosure will be further described in detail with reference to the accompanying drawings below. FIG. 1 is a schematic diagram of example environment 100 in which embodiments of the present disclosure can be implemented.

Example environment 100 in FIG. 1 may include terminal 110 (e.g., a smartphone) and server 130. Terminal 110 and server 130 communicate through network 120. A user may input image 140 (as shown in FIG. 1, an image including a plant) at terminal 110, and terminal 110 may transmit image 140 to server 130 through network 120. Server 130 may execute the method for acquiring an image according to embodiments of the present disclosure to acquire, by searching distilled images, one or more images similar to image 140, such as image 142 and image 144 including plants similar to the plant in image 140 as shown in FIG. 1. Server 130 may transmit retrieved matching images 142 and 144 to terminal 110 via network 120, thereby providing a retrieval result for the user.

Terminal 110 shown in FIG. 1 may include various types of computing devices, including but not limited to, a personal computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, etc. Server 130 shown in FIG. 1 may include various types of computing devices, including but not limited to, a personal computer, a handheld or laptop device, a mobile device (such as a mobile phone, a PDA, and a media player), a multi-processor system, a consumer electronic product, a wearable electronic device, an intelligent home device, a minicomputer, a mainframe computer, a server computing device, a distributed computing environment including any of the above systems or devices, etc. Server 130 may be deployed with the method for acquiring an image according to embodiments of the present disclosure and is configured to provide, according to a received input inquired image, a matching image similar to the inquired image by similarity comparison between the inquired image and the distilled image. Network 120 may be a network of various types, such as a local area network and/or a wide area network.

In addition, although server 130 is shown in FIG. 1 and it is illustrated that the method for acquiring an image according to embodiments of the present disclosure is executed in server 130, it can be understood that embodiments of the present disclosure may also be actually executed on terminal 110 to be adapted to inquiry demands that have high requirements for inquiry time. That is, terminal 110 may execute the method for acquiring an image according to embodiments of the present disclosure, and one or more images similar to image 140 are acquired by searching the distilled images and output to the user. The subject executing the method for acquiring an image according to embodiments of the present disclosure is not limited in the present disclosure, and an appropriate executing subject can be selected according to actual requirements of a scenario where a system is applied. In addition, although two found matching images are shown in FIG. 1, it can be understood that the number of the found matching images is not limited to two, and various numbers of matching images can be provided to the user according to the user's requirements. Besides, in some embodiments, the method for acquiring an image according to embodiments of the present disclosure may further output found matching original images in sequence based on the similarities between the distilled images and the input inquired image. The present disclosure does not limit the specific output modes.

Based on the method for acquiring an image according to embodiments of the present disclosure, an image matching an inquired image can be provided quickly, efficiently, and accurately to a user, thereby greatly improving the user experience. In addition, based on the method for acquiring an image of embodiments of the present disclosure, the distilled images are generated by the capsule neural network model, and the features of the images can also be extracted while similarity comparison is performed. Accordingly, there is no need to design a complex model, so the operation cost can be greatly reduced, and the application prospect is broad.

The block diagram of example environment 100 in which embodiments of the present disclosure can be implemented has been described above in conjunction with FIG. 1. A flow chart of method 200 for acquiring an image according to embodiments of the present disclosure will be described below in conjunction with FIG. 2. Method 200 may be executed at the computing device (terminal 110 or server 130 according to different requirements) described in FIG. 1 and/or any appropriate computing device.

Figure 2:
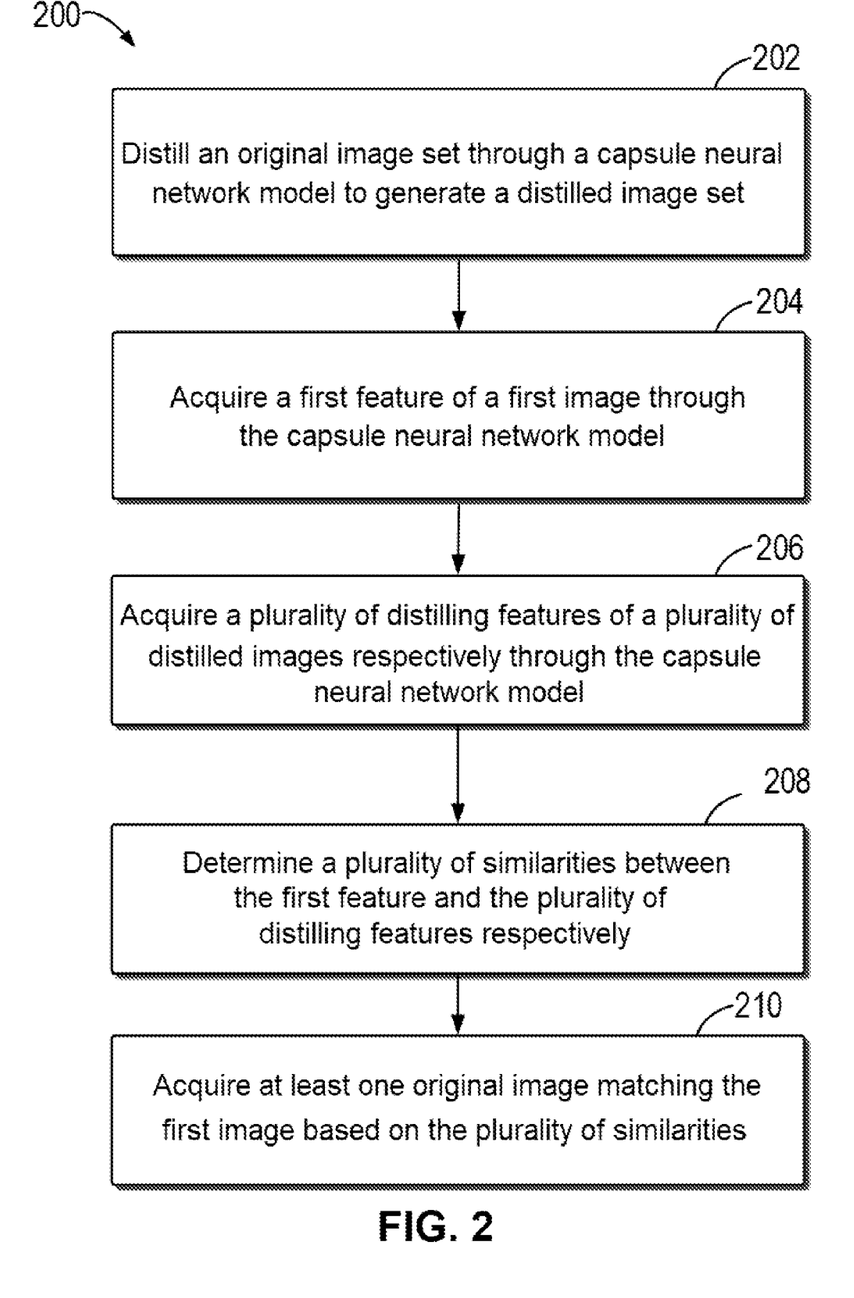
FIG. 2 illustrates a flow chart of a method for acquiring an image according to an embodiment of the present disclosure.

At block 202, the computing device may distill an original image set through a capsule neural network model to generate a distilled image set. The distilled image set may include a plurality of distilled images. According to the method for acquiring an image of embodiment of the present disclosure, the original image set is distilled by using the capsule neural network model of the present disclosure to generate the distilled image set including the plurality of distilled images. In addition, since an entropy of a weight in dynamic routing of a capsule neural network is quite low, this characteristic of the capsule neural network is fully utilized by the method for acquiring an image of embodiments of the present disclosure in the process of generating the distilled images, and a soft label of each distilled image in the distilled image set is calculated by directly utilizing output features in dynamic routing of the capsule neural network model, so that the operation cost can be greatly reduced, and the computing power and efficiency can be improved. The specific process of generating the distilled images and generating the soft label for each distilled image by the capsule neural network model will be described in detail below.

Figure 3:
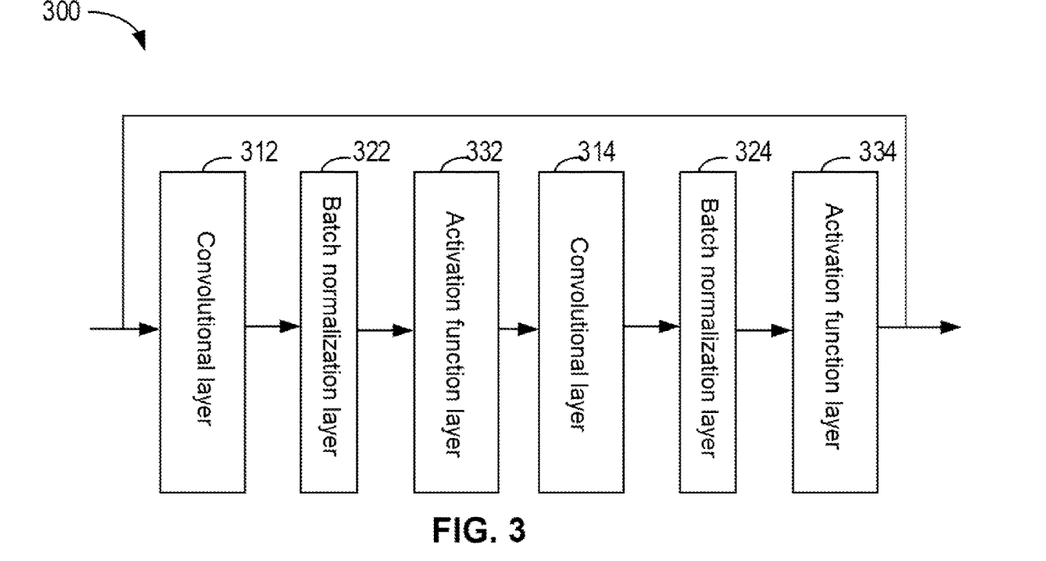
FIG. 3 illustrates a schematic diagram of a feature extracting module in a capsule neural network according to an embodiment of the present disclosure.

At block 204, the computing device acquires a first feature of a first image through the capsule neural network model. The first image may include an inquired image. The computing device may receive the inquired image input by a user to acquire one or more original images matching the inquired image. The capsule neural network model according to embodiments of the present disclosure may include a feature extracting module. The feature extracting module may extract the first feature of the first image. In some embodiments, the feature extracting module may include a convolutional layer, a batch normalization layer, and an activation function layer (e.g., a rectified linear unit (ReLu)) which are stacked. For example, FIG. 3 shows a schematic diagram of feature extracting module 300 according to embodiments of the present disclosure. As shown in FIG. 3, the feature extracting module may include convolutional layers 312 and 314, batch normalization layers 322 and 324, and activation function layers 332 and 334. Moreover, in some embodiments, an input to and an output from the feature extracting module are connected together, so that the input to and the output from the feature extracting module are in residual connection, as shown in FIG. 3. It is advantageous that more input information may be reserved through the residual connection between the input to and the output from the feature extracting module, which is more conductive to feature extraction.

At block 206, the computing device may acquire a plurality of distilling features of the plurality of distilled images respectively through the capsule neural network model. Specifically, the feature extracting module in the capsule neural network may perform feature extraction on each distilled image in the distilled image set to acquire the distilling feature of the corresponding distilled image.

At block 208, the computing device may determine a plurality of similarities between the first feature and the plurality of distilling features respectively. For example, the computing device may determine, by computing a cosine distance between the first feature and each distilling feature, the similarity between the features.

At block 210, the computing device may acquire at least one original image matching the first image based on the plurality of similarities obtained through computing. In the method for acquiring an image according to embodiments of the present disclosure, the original image matching the first image may include an image having a target object the same as or similar to a target object in the first image (i.e., the inquired image). For example, the inquired image includes a striped T-shirt, and the original image matching the first image may include an image of the same striped T-shirt, an image of a similar striped T-shirt, and the like. Moreover, the computing device may output various numbers of matching images according to the user's requirements.

Based on the method for acquiring an image of embodiment of the present disclosure, by retrieving and searching for an original image matching the inquired image in the distilled image set, the image matching the inquired image can be provided to the user quickly, efficiently, and accurately, thereby greatly improving the user experience. In addition, based on the method for acquiring an image of embodiments of the present disclosure, the capsule neural network model is used to generate the distilled images and extract the features of the images. Accordingly, there is no need to design a complex model, so the operation cost can be greatly reduced, and the application prospect is broad.

Figure 4:
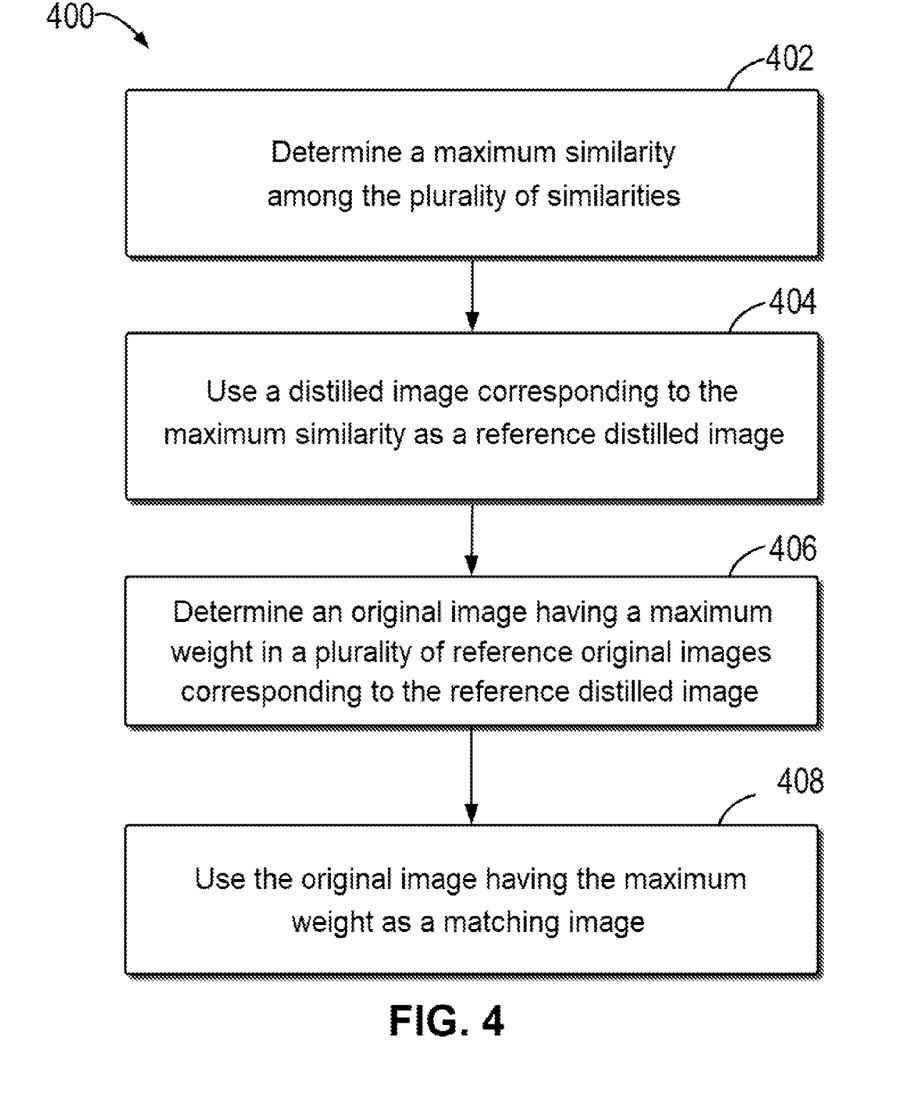
FIG. 4 illustrates a flow chart of a method for determining an original image matching a first image according to an embodiment of the present disclosure.

A process of acquiring the matching original image according to some embodiments will be described below in conjunction with FIG. 4. FIG. 4 shows a flow chart of method 400 for acquiring at least one matching original image according to embodiments of the present disclosure. It can be understood that the steps in method 400 may be executed by the computing device, the steps in method 400 are only examples, those skilled in the art can adjust the executing sequence of the steps according to requirements, and the executing sequence of method 400 is not limited in the present disclosure.

At block 402, the computing device may determine a maximum similarity among the plurality of similarities. At block 404, the computing device may use a distilled image corresponding to the maximum similarity as a reference distilled image. For example, the computing device determines that distilled image $DI_q$ in distilled image set D has the maximum similarity with the first image, and then the computing device may use distilled image $DI_q$ as the reference distilled image.

At block 406, the computing device may determine an original image in the original image set used for generating the distilled image set having a maximum weight relative to the reference distilled image. The weight may indicate the normalized similarity between each original image $O_i$ in a plurality of original images and corresponding distilled image $DI_j$. The weight of original image $O_i$ relative to distilled image $DI_j$ may be calculated through the following Equation (1):

$$w_{i,j} = \frac{sim <i, j>}{\sum_{p \in P} sim <i, p>} \quad (1)$$

where P indicates the distilled image set, sim $\langle \ldots, \ldots \rangle$ indicates the similarity between original image $O_i$ and corresponding distilled image $DI_j$, and in this example, the calculation is performed by adopting cosine similarity. It can be understood by those skilled in the art that any appropriate similarity calculation method may be used, which is not limited in the present disclosure.

At block 408, the computing device may use the original image having the maximum weight as the original image matching the first image. The computing device may acquire the original image in the original image set having the maximum weight relative to the reference distilled image and use the original image as the image matching the first image. The computing device may provide corresponding matching original images in sequence according to the sequence of weights from large to small relative to the reference distilled image based on the user's requirements, namely, the number of the matching images required by the user.

By using the distilled image having the maximum similarity with the first image as the reference distilled image, the original image matching the first image may be intuitively acquired, and thus the operation complexity and operation cost can be lowered.

In some other embodiments, the computing device may acquire the original image matching the first image based on the soft label of the first image. In some embodiments, the soft label includes a plurality of elements, and each element indicates a probability that the first image belongs to each of a plurality of target classes. The soft label may be acquired based on the weights acquired in Equation (1) above. That is, the computing device may determine the soft label of the first image based on the similarity between the first feature of the first image and the distilling feature of each distilled image in the distilled image set.

In some embodiments, after weight $w_{i,j}$ of the first image relative to each distilled image in the distilled image set is acquired, the computing device may determine soft label $L_{soft,i}$ of the first image according to soft label $L_{soft,j}$ of each distilled image $DI_j$ and calculated weight $w_{i,j}$ and according to Equation (1) above. Specifically, the computing device may weight the soft label $L_{soft,j}$ of each distilled image $DI_j$ using the weight $w_{i,j}$ calculated according to Equation (1) above so as to acquire a weighted soft label $L_{soft,wj}$ of each distilled image $DI_j$. Afterwards, the computing device may sum probabilities for corresponding target classes among a plurality (e.g., all) of weighted soft labels $L_{soft,wj}$ to determine the image soft label $L_{soft,i}$ of the first image.

The above steps may be implemented through Equation (2) as follows:

$$L_{soft,i} = \sum_{p \in P} w_{i,p} \times L_{soft,p} \quad (2)$$

For example, illustration is provided using an example in which the distilled image set includes four distilled images, and each distilled image has corresponding soft labels corresponding to four target classes. The soft label may be a label represented in a probability form, and is used for indicating a probability that the corresponding distilled image belongs to a target class. For example, the distilled image set includes: first distilled image $DI_1$, first distilled image $DI_1$ having soft label $L_{soft,1}$=[0.2, 0.5, 0.2, 0.1]; second distilled image $DI_2$, second distilled image $DI_2$ having soft label $L_{soft,2}$=[0.4, 0.1, 0.3, 0.2]; third distilled image $DI_3$, third distilled image $DI_3$ having soft label $L_{soft,3}$=[0.1, 0.2, 0.4, 0.3]; and fourth distilled image $DI_4$, fourth distilled image $DI_4$ having soft label $L_{soft,4}$=[0.1, 0.6, 0.0, 0.3]. Assuming that according to Equation (1) above, the weight of the first image with respect to each distilled image $ID_j$ has been acquired, that is, reference weight $w_1$ for first distilled image $DI_1$ is equal to 0.2; reference weight $w_2$ for second distilled image $DI_2$ is equal to 0.1, reference weight $w_3$ for third distilled image $DI_3$ is equal to 0.3, and reference weight $w_4$ for fourth distilled image $DI_4$ is equal to 0.4. Therefore, soft label $L_{soft,j}$ of each corresponding distilled image $ID_j$ may be weighted, and the probabilities of the corresponding target classes in the four weighted soft labels $L_{soft,wj}$ are summed to determine image soft label $L_{soft,i}$ of the first image.

For example, in the example above, weighted soft label $L_{soft,w1}$ corresponding to first distilled image $ID_1$ is equal to 0.2×[0.2, 0.5, 0.2, 0.1]=[0.04, 0.1, 0.04, 0.02]; weighted soft label $L_{soft,w2}$ corresponding to second distilled image $ID_2$ is equal to 0.1×[0.4, 0.1, 0.3, 0.2]=[0.04, 0.01, 0.03, 0.02]; weighted soft label $L_{soft,w3}$ corresponding to third distilled image $ID_3$ is equal to 0.3×[0.1, 0.2, 0.4, 0.3]=[0.03, 0.06, 0.12, 0.09], and weighted soft label $L_{soft,w4}$ corresponding to fourth distilled image $ID_4$ is equal to 0.4×[0.1, 0.6, 0.0, 0.3]=[0.04, 0.24, 0.0, 0.12]. Correspondingly, image soft label $L_{soft,i}$ of the input image is equal to [0.04+0.04+0.03+0.04, 0.1+0.01+0.06+0.24, 0.04+0.03+0.12+0.0, 0.02+0.02+0.09+0.12]=[0.15, 0.41, 0.19, 0.25].

The process of determining image soft label $L_{soft,i}$ of the first image is introduced through the description above. After image soft label $L_{soft,i}$ of the first image is determined, the computing device may determine the probability that the first image belongs to each of the target classes and may determine the target class for which the probability is the maximum. For example, illustration is further provided using the example above as an example, the calculated soft label of the first image is [0.15, 0.41, 0.19, 0.25], and then the computing device may determine that the probability that the first image belongs to the second target class is the maximum, and is 0.41. Therefore, the computing device may acquire an original image in the original image set having the maximum similarity with the second target class, and use the acquired original image having the maximum similarity as the image matching the first image.

In some embodiments, the computing device may further acquire an original image of at least one target class based on the soft label and the number of matching images to be acquired. For example, illustration is further provided using the example above as an example, the soft label of the first image calculated by the computing device is [0.15, 0.41, 0.19, 0.25], and then the computing device may determine that the probability that the first image belongs to the second target class is the maximum, and is 0.41. When the computing device determines that the number of the matching images to be acquired is 10, the computing device may acquire 10×0.41≈4 matching original images in the second target class. The computing device may begin to select from the original images having the maximum similarity according to the similarities between the original images and the second target class, and sequentially select four matching original images as the images matching the first image. The computing device may further continue to multiply the number of the matching images to be acquired by other elements in the soft label and acquire the number of original images under the corresponding target class, and further obtain the required number of matching images according to the sequence of similarities of the original images under the target class.

Figure 5:
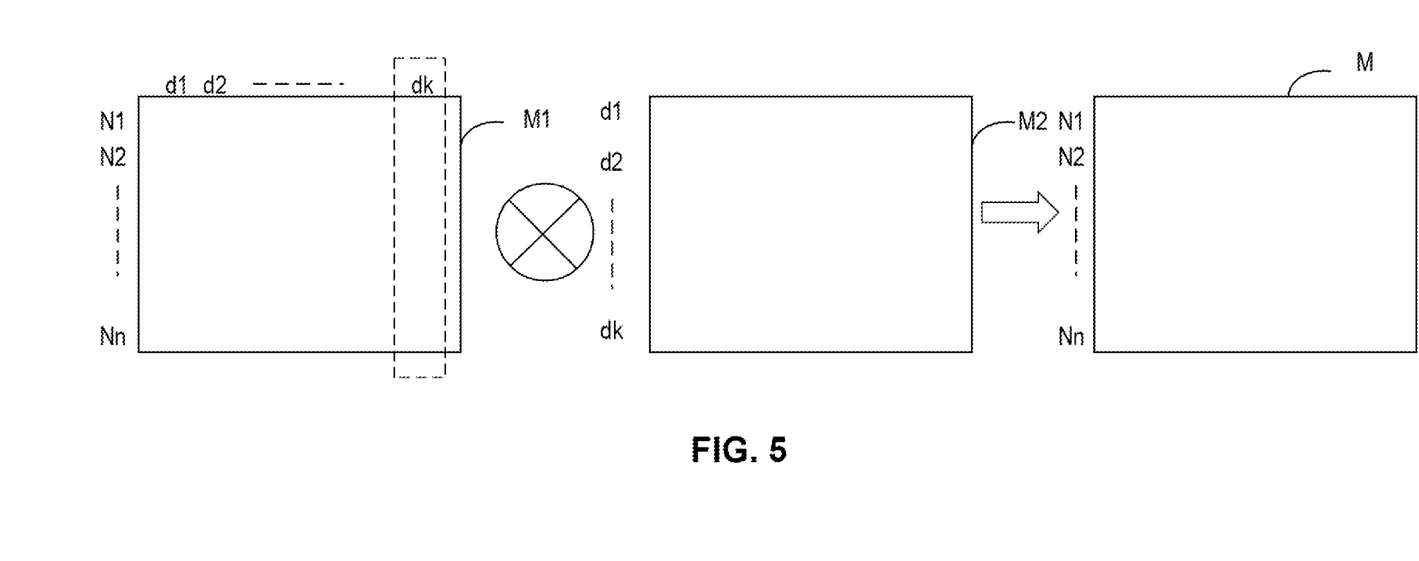
FIG. 5 illustrates a schematic diagram of a process of determining a soft label of a distilled image according to an embodiment of the present disclosure.

In some embodiments, the computing device may distill the original image set through the capsule neural network model to generate a distilled image set, the distilled image set including a plurality of distilled images. FIG. 5 shows a schematic diagram of a process for determining a soft label of a distilled image according to an embodiment of the present disclosure. A process of generating distilled images will be described in detail below in conjunction with FIG. 5.

As described above, each distilled image in the distilled image set has soft label $L_{soft}$ represented in a probability form. For example, soft label $L_{soft}$=[0,0.82, 0.03, 0.11, 0.0, 0.04], where values in the soft label correspond to six target classes in sequence from left to right: target class 1, target class 2, target class 3, target class 4, target class 5, and target class 6. Further, soft label $L_{soft}$ indicates that a probability that a corresponding distilled image belongs to target class 1 is 0, a probability that a corresponding distilled image belongs to target class 2 is 0.82, a probability that a corresponding distilled image belongs to target class 3 is 0.03, a probability that a corresponding distilled image belongs to target class 4 is 0.11, a probability that a corresponding distilled image belongs to target class 5 is 0, and a probability that a corresponding distilled image belongs to target class 6 is 0.04. In addition, the sum of the values of elements in the soft label is 1. For example, in soft label $L_{soft}$, 0.82+0.03+0.11+0.04=1.

When acquiring the distilled image set, the computing device may input each original image in the original image set into the capsule neural network model and obtain a set of output features (e.g., matrix M1 indicated by a block shown in FIG. 5). The computing device may acquire a set of capsule features of the capsule neural network (e.g., matrix M2 indicated by a block shown in FIG. 5), and the computing device may acquire the distilled image set based on the set of output features and the set of capsule features. For example, the computing device may acquire a set of intermediate features based on the set of output features and the set of capsule features, and the set of intermediate features is further processed by a fully connected layer in the capsule neural network model to obtain the final distilled image output.

In some embodiments, the computing device, when inputting each original image in the original image set to the capsule neural network model, may acquire the output from a high layer of capsules (e.g., a first capsule layer) in the capsule neural network model and use the output as the set of output features. As shown in FIG. 5, in some embodiments, the set of output features may include output feature matrix M1, the number of rows of output feature matrix M1 corresponds to the number n of original images in the original image set, and the number of columns of output feature matrix M1 corresponds to the number k of capsules in the capsule neural network model. Moreover, each row in output feature matrix M1 indicates image features of the original images corresponding to the row. In some embodiments, each element of each row in output feature matrix M1 may be represented as an output probability of the original image corresponding to the row with respect to each capsule (e.g., obtained after performing normalization processing on the image features of the row). For example, in output feature matrix M1 as shown in FIG. 5, for original image N1 corresponding to the first row, the elements ($a_{11}$, $a_{12}$, $a_{13}$, ... $a_{1k}$) in this first row may denote the image features of original image N1, and each element $a_{1j}$ (1≤j≤k, and j is a positive integer) denotes the output probability of original image N1 for corresponding capsule dj in the capsule neural network model.

The set of capsule features is further illustrated in FIG. 5. For example, in some embodiments, the set of capsule features may be represented as matrix M2, wherein the number of rows of the matrix corresponds to the number of capsules in the capsule neural network model, as shown in FIG. 5. Moreover, the number of columns of the matrix corresponds to i, indicating that each capsule has an i-dimensional vector. In some embodiments, this matrix M2 may be obtained through learning.

The computing device may obtain feature matrix M by multiplying output feature matrix M1 by capsule feature matrix M2, feature matrix M characterizing intermediate features of the original images. Further, a fully connected layer in the capsule neural network model may further process feature matrix M, so that the capsule neural network model can output the distilled images.

As shown in FIG. 5, for output feature matrix M1, each column vector pj (shown by a dotted-line block in FIG. 5) of feature matrix M1 may denote the output probability (e.g., obtained, for example, by normalizing the image features of each row) of each original image in the original image set at that corresponding capsule di. Since capsules correspond to target classes, it may be understood that each element in a column vector of output feature matrix M1 denotes the probability that each original image in the original image set belongs to that corresponding target class. For example, taking the first column in output feature matrix M1 as an example, element $a_{11}$ may denote the output probability that the first original image belongs to the first target class (corresponding to capsule d1), element $a_{21}$ may denote the output probability that the second original image belongs to the first target class (corresponding to capsule d1), and by analogy, element $a_{n1}$ may denote the output probability that the nth original image belongs to the first target class (corresponding to capsule d1). For the sake of brevity, elements in other columns Pi in output feature matrix M1 will not be listed one by one.

According to the column vectors in output feature matrix M1, a soft label for each distilled image may be acquired. Specifically, in some embodiments, the computing device may acquire a column vector in output feature matrix M1 that corresponds to the corresponding target class. For example, the computing device may acquire column vector pj in output feature matrix M1 that corresponds to target class $Class_j$ (corresponding to capsule dj, 1≤j≤k, and j is a positive integer), wherein each element in column vector pj denotes the output probability that each original image belongs to that target class. For example, the output probability may be expressed as ($a_{1j}$, $a_{2j}$, $a_{3j}$, . . . , $a_{nj}$). The computing device may determine the probability value corresponding to each distilled image based on the elements in column vector pj. For example, the computing device may first determine which distilled image each original image in the original images belongs to, and may then determine the probability value corresponding to each distilled image. The computing device may further determine, based on the probability value corresponding to each distilled image, the probability that each distilled image is under corresponding target class dj as a soft label for the distilled image.

Specifically, in some embodiments, the computing device may determine distilled images corresponding to the probability values in column vector pj. In an illustrative example, illustration is provided using an example in which L distilled images are generated from n original images, and for the jth target class, the computing device may acquire column vector pj. The computing device may determine the probability value corresponding to each distilled image based on column vector pj. For example, assuming that the probability corresponding to first distilled image $ID_1$ is $a_{1j}$, the probability corresponding to second distilled image $ID_2$ is $a_{2j}$, the probability corresponding to third distilled image $ID_3$ is $a_{3j}$, and by analogy, the probability corresponding to the Lth distilled image $ID_L$ is $a_{Lj}$. It should be understood that the above assumptions are for illustrative purposes and are merely examples.

The computing device may determine the number of original images corresponding to each probability value in the column vector based on the determined number of original images corresponding to the distilled image. Still using the above example as an example, assuming that first distilled image $ID_1$ corresponds to n1 original images, second distilled image $ID_2$ corresponds to n2 original images, third distilled image $ID_3$ corresponds to n3 original images, and by analogy, Lth distilled image $ID_L$ corresponds to nL original images, and n1+n2+n3+ . . . +nL=n. Thus, the probability that each distilled image is under the corresponding target class can be determined based on each probability value and the number of original images corresponding to each probability value.

For example, using the above example as an example, for each distilled image z, the probability that it is under the jth target class can be calculated by Equation (3) as follows:

$$Pro_{zj} = \frac{(nz \times a_{zj})}{(n1 \times a_{1j} + n2 \times a_{2j} + n3 \times a_{3j} \ldots + nL \times a_{Lj})} \quad (3)$$

where $Pro_{zj}$ is the probability that each distilled image z is under the jth target class, and $a_{zj}$ is the corresponding probability value of corresponding distilled image z in that column vector. In addition, $1 \leq z \leq L$, and z is a positive integer.

The computing device may perform a calculation for each target class, determine corresponding probability value $Pro_{zj}$ for each distilled image, and combine the determined probability values to form the soft label $[Pro_{z1}, Pro_{z2}, \ldots Pro_{zk}]$ corresponding to each distilled image, where k is the number of target classes.

In addition, in order to improve the operation efficiency, the computing device may further select probability values greater than a probability threshold from the selected column vector, determine the number of the original images corresponding to each distilled image corresponding to each probability value from the selected probability values, and determine the probability that each distilled image is under the corresponding target class based on each probability value and the number of the original images corresponding to each probability value. For the specific determination process, reference may be made to the above description, which is not repeated here for the sake of brevity.

The process of acquiring the distilled image set based on the original image set by the capsule neural network model is described above. In some embodiments, the capsule neural network model according to embodiments of the present disclosure may also be used for similarity comparison between two images, and these two images may neither belong to the generated distilled image set nor the original image set. Therefore, the function of the capsule neural network may be extended, and the computing resources and computing cost may be saved.

Figure 6:
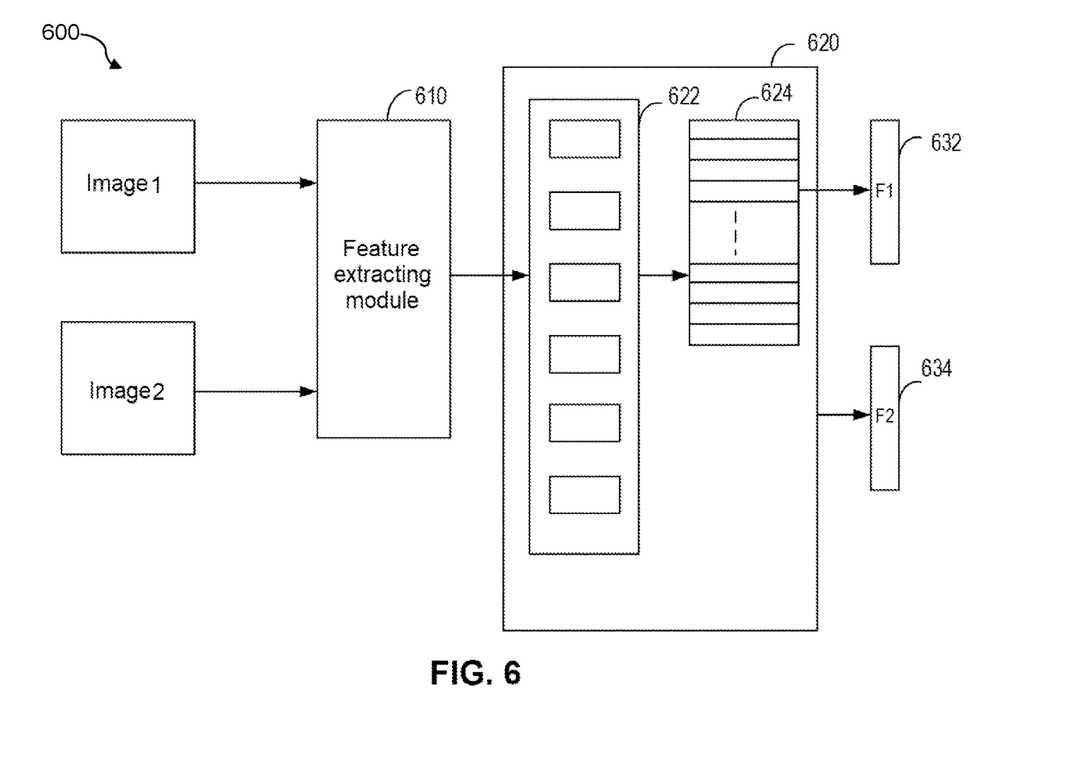
FIG. 6 illustrates a schematic diagram of a capsule neural network model for implementing a similarity comparison between two images according to an embodiment of the present disclosure.

FIG. 6 shows a schematic diagram of a capsule neural network model 600 for implementing a similarity comparison between two images according to embodiments of the present disclosure, and the capsule neural network model 600 is a model used for generating the distilled image set. The capsule neural network model 600 in FIG. 6 may be deployed in the computing device for similarity comparison between two images.

As shown in FIG. 6, capsule neural network model 600 may include feature extracting module 610 and capsule layer 620. Feature extracting module 610 is configured to extract capsule features of images and has been described above in conjunction with FIG. 3, which is not repeated here. Capsule layer 620 may include two parts: main capsule layer 622 and classifying capsule layer 624. The features extracted by feature extracting module 610 may be grouped at main capsule layer 622 relative to a feature dimension. In some embodiments, main capsule layer 622 may have a 16-dimensional 32-channel, and main capsule layer 622 is fully connected to classifying capsule layer 624. Classifying capsule layer 624 may have c 16-dimensional capsules, and c denotes the number of the target classes. It can be understood that the above description of capsule layer 620 is merely illustrative, and those skilled in the art can make various modifications and adjustments on the capsule layer according to actual requirements, which is not limited in the present disclosure.

Capsule neural network model 600 may receive two images: image 1 and image 2. Image 1 and image 2 belong to neither the original image set nor the distilled image set. Accordingly, capsule neural network model 600 according to embodiments of the present disclosure may perform a similarity comparison between the two images so as to determine the similarity between the two images, and provide a judging basis for subsequent processing.

As shown in FIG. 6, feature extraction is performed on image 1 and image 2 respectively via feature extracting module 610 and capsule layer 620, so that respective image features F1 632 and F2 634 can be obtained. The computing device may calculate the similarity between the two images based on obtained image features F1 632 and F2 634. For example, the computing device may determine the similarity between image 1 and image 2 by calculating a cosine distance between feature F1 632 and feature F2 634. In addition, the computing device may further determine the similarity between feature F1 632 and feature F2 634 by adopting other calculation methods, which are not limited by the present disclosure.

Figure 7:
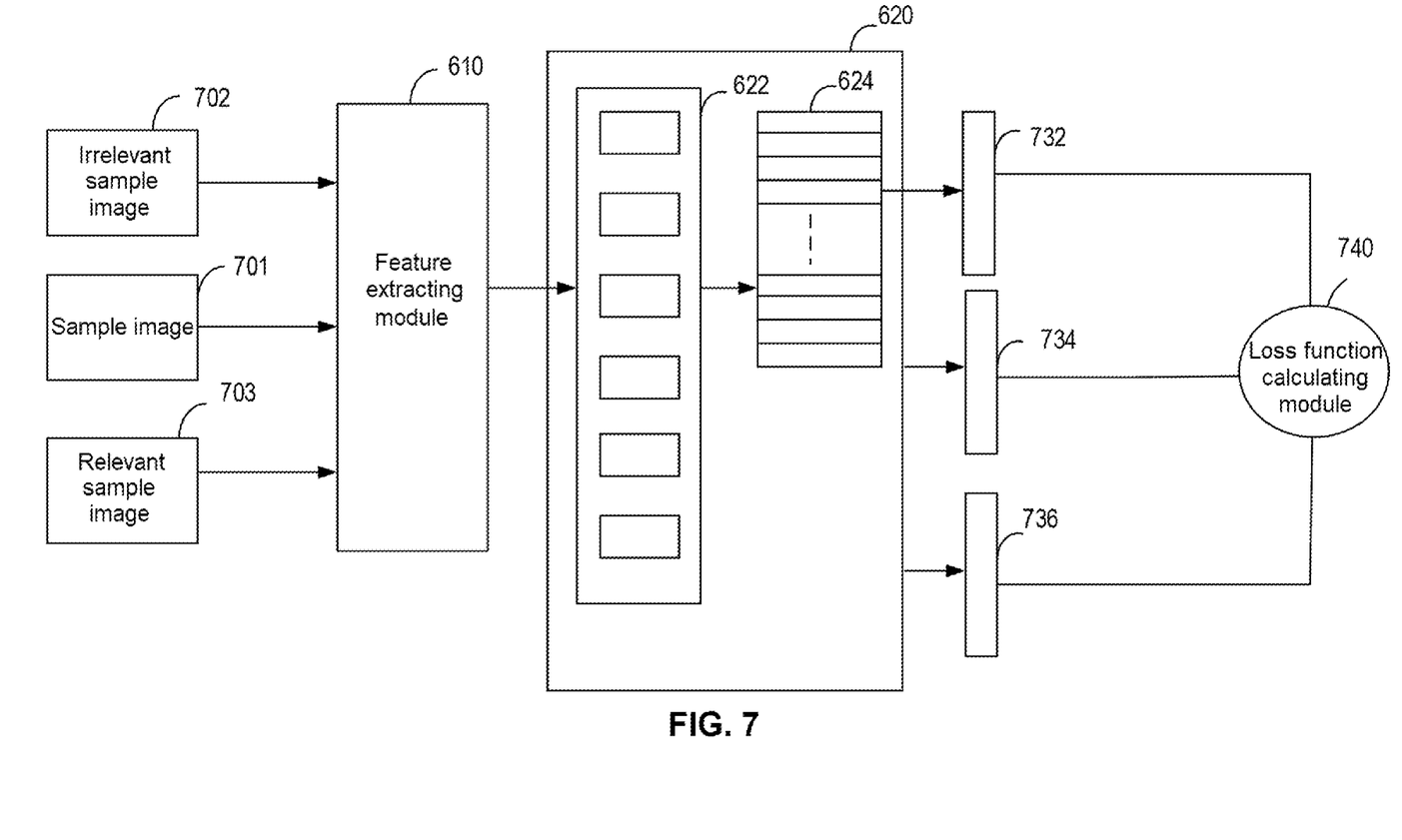
FIG. 7 illustrates a schematic diagram of a process of training a capsule neural network model.

In some embodiments, the capsule neural network model 600 in FIG. 6 may be obtained by training based on a triplet loss function. A training process of the capsule neural network model will be described below in conjunction with FIG. 7. FIG. 7 shows a schematic diagram of training process 700 of the capsule neural network model according to embodiments of the present disclosure. The elements in FIG. 7 the same as those in FIG. 6 are represented with the same reference numerals. As shown in FIG. 7, the capsule neural network model includes feature extracting module 610 and capsule layer 620. Feature extracting module 610 and capsule layer 620 have been described above, and will not be described again here.

When the capsule neural network model is trained, the capsule neural network model receives three images: sample image 701, image 702 irrelevant to the sample image, and image 703 relevant to the sample image. In some embodiments, being relevant may indicate that a relevancy between target objects in two sample images is greater than a relevancy threshold; and being irrelevant may indicate that a relevancy of target objects in two sample images is less than a relevancy threshold. The relevancy threshold may be set according to the desired accuracy of the capsule neural network model, which is not limited in the present disclosure.

In the training process, the capsule neural network model may obtain features 1 734, 1⁻ 732, and 1⁺ 736 of sample image 701, image 702 irrelevant to the sample image, and image 703 relevant to the sample image respectively. Loss function calculating module 740 may determine first loss function $L_r$ based on Equation (4) as follows:

$$L_r = \sum_j [d(l_i, l_i^+) - d(l_i, l_i^-) + \alpha] \qquad (4)$$

where d( ) denotes the distance between two features, and in some embodiments, d( ) may denote a Euclidean distance between two features, and α is a distance margin.

During the training of this capsule neural network, its loss function is related to a difference between the following parameters: mutual information between the original dataset and the distilled dataset; and a similarity between the original dataset and the distilled dataset.

In one embodiment, loss function calculating module 740 may further calculate mutual information I(X, Z) between original image set X and distilled image set Z through Equation (5):

$$I(X, Z) = \int \int p(z|x)\hat{p}(x)\log\frac{p(z|x)}{p(z)}dxdz \qquad (5)$$

where $p(z)=\int p(z|x)\hat{p}(x)dx$.

Moreover, loss function calculating module 740 may further calculate similarity $L_{or}$ between original image set X and distilled image set Z through Equation (6):

$$L_{or} = \sum_{i,j \in Z} \langle i, j \rangle \qquad (6)$$

where $\langle i, j \rangle$ denotes the similarity between respective corresponding images in two image sets.

Therefore, loss function calculating module 740 may determine an example triplet loss function for training the capsule neural network model as shown in Equation (7):

$$\mathbb{L} = L_{or}(Z) - I(X,Z) + L_r \qquad (7)$$

Based on Equation (7) above, the computing device may adjust parameters of the capsule neural network model to implement training of the capsule neural network model.

Figure 8:
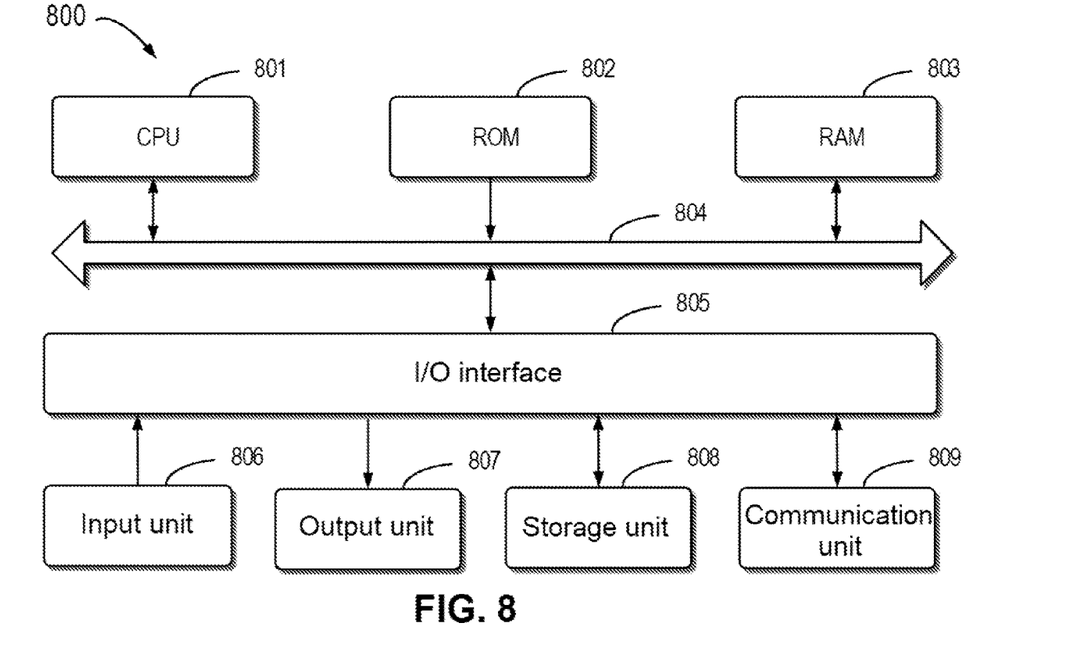
FIG. 8 illustrates a block diagram of an example device suitable for implementing embodiments of the present disclosure.

FIG. 8 is a block diagram of example device 800 that can be used to implement an embodiment of the present disclosure. Computing devices for executing the method according to embodiments of the present disclosure may be implemented using device 800. As shown in the figure, device 800 includes central processing unit (CPU) 801, which may execute various appropriate actions and processing according to computer program instructions stored in read-only memory (ROM) 802 or computer program instructions loaded from storage unit 808 onto random access memory (RAM) 803. Various programs and data required for the operation of device 800 may also be stored in RAM 803. CPU 801, ROM 802, and RAM 803 are connected to each other through bus 804. Input/Output (I/O) interface 805 is also connected to bus 804.

A plurality of components in device 800 are connected to I/O interface 805, including: input unit 806, such as a keyboard and a mouse; output unit 807, such as various types of displays and speakers; storage page 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various processes and processing described above, such as method 200 for acquiring an image and the related processes (e.g., method 400), may be performed by CPU 801. For example, in some embodiments, method 200 for dataset updating and the related processes (e.g., method 400) may be implemented as a computer software program that is tangibly contained in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more actions of method 200 for acquiring an image and the related processes (e.g., method 400) described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/ processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the embodiments disclosed herein.

What is claimed is:

1. A method for acquiring an image, comprising:
   distilling an original image set through a capsule neural network model to generate a distilled image set, the distilled image set comprising a plurality of distilled images;
   acquiring a first feature of a first image through the capsule neural network model;
   acquiring a plurality of distilling features of the plurality of distilled images respectively through the capsule neural network model;
   determining a plurality of similarities between the first feature and the plurality of distilling features respectively; and
   acquiring at least one original image matching the first image based on the plurality of similarities;
   wherein generating the distilled image set through the capsule neural network model comprises:
   inputting each original image in the original image set to the capsule neural network model and acquiring a set of output features;
   acquiring a set of capsule features of the capsule neural network model; and
   acquiring the distilled image set based on the set of output features and the set of capsule features;
   wherein the set of output features comprises an output feature matrix, and wherein an element in a column vector of the output feature matrix indicates a probability that each original image in the original image set belongs to a corresponding target class.

2. The method according to claim 1, wherein acquiring the at least one original image matching the first image comprises:
  determining a maximum similarity among the plurality of similarities;
  using a distilled image corresponding to the maximum similarity as a reference distilled image;
  determining an original image in the original image set having a maximum weight relative to the reference distilled image; and
  using the original image having the maximum weight as the original image matching the first image.

3. The method according to claim 1, wherein acquiring the at least one original image matching the first image comprises:
  determining a soft label of the first image based on the plurality of similarities, wherein the soft label comprises a plurality of elements, and each element indicates a probability that the first image belongs to each of a plurality of target classes; and
  acquiring the at least one original image based on the soft label.

4. The method according to claim 1, wherein generating the distilled image set through the capsule neural network model further comprises:
  acquiring a column vector in the output feature matrix that corresponds to the corresponding target class;
  determining a probability value corresponding to each distilled image based on elements in the column vector; and
  determining, based on the probability value corresponding to each distilled image, a probability that each distilled image is under the corresponding target class as a soft label of the distilled image.

5. The method according to claim 4, wherein determining, based on the probability value corresponding to each distilled image, the probability that each distilled image is under the corresponding target class comprises:
  determining the number of original images corresponding to the distilled image corresponding to each probability value; and
  determining, based on each probability value and the number, the probability that each distilled image is under the corresponding target class.

6. The method according to claim 1, further comprising:
  receiving a second image and a third image; and
  determining a similarity between the second image and the third image through the capsule neural network model, wherein the distilled image set does not include the second image and the third image.

7. The method according to claim 1, wherein the first feature and the plurality of distilling features are extracted through a feature extracting module in the capsule neural network model, and wherein an input to and an output from the feature extracting module are in residual connection.

8. The method according to claim 1, further comprising:
  training the capsule neural network model based on a triplet loss function.

9. An electronic device, comprising:
  at least one processor; and
  memory coupled to the at least one processor and having instructions stored thereon, wherein the instructions, when executed by the at least one processor, cause the electronic device to perform actions comprising:
    distilling an original image set through a capsule neural network model to generate a distilled image set, the distilled image set comprising a plurality of distilled images;
    acquiring a first feature of a first image through the capsule neural network model;
    acquiring a plurality of distilling features of the plurality of distilled images respectively through the capsule neural network model;
    determining a plurality of similarities between the first feature and the plurality of distilling features respectively; and
    acquiring at least one original image matching the first image based on the plurality of similarities;
    wherein generating the distilled image set through the capsule neural network model comprises:
    inputting each original image in the original image set to the capsule neural network model and acquiring a set of output features;
    acquiring a set of capsule features of the capsule neural network model; and
    acquiring the distilled image set based on the set of output features and the set of capsule features;
    wherein the set of output features comprises an output feature matrix, and wherein an element in a column vector of the output feature matrix indicates a probability that each original image in the original image set belongs to a corresponding target class.

10. The electronic device according to claim 9, wherein acquiring the at least one original image matching the first image comprises:
  determining a maximum similarity among the plurality of similarities;
  using a distilled image corresponding to the maximum similarity as a reference distilled image;
  determining an original image in the original image set having a maximum weight relative to the reference distilled image; and
  using the original image having the maximum weight as the original image matching the first image.

11. The electronic device according to claim 9, wherein acquiring the at least one original image matching the first image comprises:
  determining a soft label of the first image based on the plurality of similarities, wherein the soft label comprises a plurality of elements, and each element indicates a probability that the first image belongs to each of a plurality of target classes; and
  acquiring the at least one original image based on the soft label.

12. The electronic device according to claim 9, wherein generating the distilled image set through the capsule neural network model further comprises:
  acquiring a column vector in the output feature matrix that corresponds to the corresponding target class;
  determining a probability value corresponding to each distilled image based on elements in the column vector; and
  determining, based on the probability value corresponding to each distilled image, a probability that each distilled image is under the corresponding target class as a soft label of the distilled image.

13. The electronic device according to claim 12, wherein determining, based on the probability value corresponding to each distilled image, the probability that each distilled image is under the corresponding target class comprises:

determining the number of original images corresponding to the distilled image corresponding to each probability value; and determining, based on each probability value and the number, the probability that each distilled image is under the corresponding target class.

14. The electronic device according to claim 9, wherein the instructions, when executed by the at least one processor, cause the electronic device to perform actions comprising:

receiving a second image and a third image; and determining a similarity between the second image and the third image through the capsule neural network model, wherein the distilled image set does not include the second image and the third image.

15. The electronic device according to claim 9, wherein the first feature and the plurality of distilling features are extracted through a feature extracting module in the capsule neural network model, and wherein an input to and an output from the feature extracting module are in residual connection.

16. A computer program product that is tangibly stored on a non-transitory computer-readable medium and comprises machine-executable instructions, wherein the machine-executable instructions, when executed by a machine, cause the machine to perform actions comprising:

distilling an original image set through a capsule neural network model to generate a distilled image set, the distilled image set comprising a plurality of distilled images;

acquiring a first feature of a first image through the capsule neural network model;

acquiring a plurality of distilling features of the plurality of distilled images respectively through the capsule neural network model;

determining a plurality of similarities between the first feature and the plurality of distilling features respectively; and acquiring at least one original image matching the first image based on the plurality of similarities;

wherein generating the distilled image set through the capsule neural network model comprises:

inputting each original image in the original image set to the capsule neural network model and acquiring a set of output features;

acquiring a set of capsule features of the capsule neural network model; and acquiring the distilled image set based on the set of output features and the set of capsule features;

wherein the set of output features comprises an output feature matrix, and wherein an element in a column vector of the output feature matrix indicates a probability that each original image in the original image set belongs to a corresponding target class.

17. The method according to claim 1, wherein the capsule neural network model comprises a feature extraction portion coupled to a capsule layer portion, the capsule layer portion comprising a main capsule layer and a classifying capsule layer.

18. The electronic device according to claim 9, wherein the capsule neural network model comprises a feature extraction portion coupled to a capsule layer portion, the capsule layer portion comprising a main capsule layer and a classifying capsule layer.

19. The method according to claim 1, wherein the output feature matrix has a number of rows that corresponds to a number n of original images in the original image set, and a number of columns that corresponds to a number k of capsules in the capsule neural network model.

20. The electronic device according to claim 9, wherein the output feature matrix has a number of rows that corresponds to a number n of original images in the original image set, and a number of columns that corresponds to a number k of capsules in the capsule neural network model.

* * * * *